United States Patent [19]

Nakayama et al.

[11] Patent Number: 4,806,585

[45] Date of Patent: Feb. 21, 1989

[54] ONE-CAN RESIN COMPOSITIONS

[75] Inventors: Takeo Nakayama, Ibaraki; Takurou Sakamoto, Kawanishi, both of Japan

[73] Assignee: Takeda Chemical Industries, Ltd., Osaka, Japan

[21] Appl. No.: 96,406

[22] Filed: Sep. 15, 1987

[30] Foreign Application Priority Data

Sep. 16, 1986 [JP] Japan ................................ 61-218913

[51] Int. Cl.$^4$ ........................... C08K 5/05; C08K 5/06; C08L 65/04; C08L 75/06
[52] U.S. Cl. ..................................... 524/376; 524/379; 524/380; 525/122; 525/124; 525/127; 525/440
[58] Field of Search ............... 525/124, 440, 122, 127; 524/376, 379, 380

[56] References Cited

U.S. PATENT DOCUMENTS

| | | | |
|---|---|---|---|
| 4,102,847 | 7/1978 | Hartmann et al. | 525/124 |
| 4,518,522 | 5/1985 | Markush et al. | 524/379 |
| 4,533,684 | 8/1985 | Kordomenos et al. | 525/440 |
| 4,649,067 | 3/1987 | Gras | 525/440 |
| 4,657,962 | 4/1987 | Brindöpke et al. | 525/124 |
| 4,711,929 | 12/1987 | Stamegna et al. | 525/440 |

*Primary Examiner*—Allan M. Lieberman
*Attorney, Agent, or Firm*—Wenderoth, Lind & Ponack

[57] ABSTRACT

A one-can resin composition which contains:
(1) a blocked polyisocyanate produced by blocking, with an oxime type blocking agent, $\alpha,\alpha,\alpha',\alpha'$-tetramethylxylylene diisocyanate or a terminal NCO-containing prepolymer formed by reaction of said diisocyanate with an active hydrogen-containing compound,
(2) a polyol compound and
(3) a monoalcohol.

The resin composition, when stored at 40° C., is stable for at least 3 months. It can be cured at temperatures as low as 90°–120° C. Therefore, it can be used advantageously as a baking paint for automotive exterior coating, cationic electro-deposition coating, coating of household electric appliances, and enameled wire manufacture, among others.

12 Claims, No Drawings

ONE-CAN RESIN COMPOSITIONS

This invention relates to a one-can resin composition improved in storage stability and low-temperature coat film curability and, in particular, to a resin composition useful as a baking paint for automotive exterior coating and for coating household electric appliances, among others.

One-can resin compositions in which a blocked polyisocyanate and a polyol compound such as a polyester polyol, polyether polyol, acrylic polyol or epoxy resin are combined are in wide use as baking paints for automotive exterior coating, cationic electrodeposition coating, household electric appliance coating, and enameled wire manufacture, among others, since they give coat films satisfactory in resistance to corrosion and to chemicals and in mechanical properties.

Generally, however, one-can coating compositions comprising a combination of a blocked polyisocyanate and a polyol compound require heating at 140°–180° C. for 20–40 minutes for curing thereof. This results in an increased energy cost. Moreover, articles which are coatable with them are limited to metal products.

On the other hand, some one-can resin compositions in which a blocked polyisocyanate and an amino group-containing compound are combined can be cured at lower temperatures such as 100°–120° C. However, such compositions are very poor in storage stability, hence cannot be put to practical use.

It is an object of the invention to provide a resin composition which is excellent in storage stability as well as in low-temperature curing characteristics of coat films and physical properties of cured coat films.

In view of the foregoing circumstances, intensive investigations were made in an attempt to find out a one-can resin composition which is satisfactory in storage stability and is coatable of giving coat films excellent in low-temperature curability, weather resistance, corrosion resistance, mechanical properties and so forth. As a result, it was found that a one-package resin composition containing a specific blocked polyisocyanate compound and a polyol compound together with a monoalcohol has good storage stability and gives coat films showing good low-temperature curability. These findings have now led to completion of the present invention.

The invention thus provides a one-can resin composition which contains:

(1) a blocked polyisocyanate produced by blocking, with an oxime type blocking agent, α,α,α',α'-tetramethylxylylene diisocyanate or a terminal NCO-containing prepolymer formed by reaction of said diisocyanate with an active hydrogen-containing compound, (2) a polyol compound and (3) as a solvent, a monoalcohol, a glycol ether or a halo alcohol.

The blocked polyisocyanate (1) to be used in the practice of the invention can be readily obtained by reacting an oxime type blocking agent with α,α,α',α'-tetramethylxylylene diisocyanate (hereinafter abbreviated as "TMXDI") or a prepolymer obtained by reacting said diisocyanate with an active hydrogen-containing low-molecular-weight compound, for example a dihydric alcohol such as ethylene glycol, propylene glycol, dipropylene glycol, diethylene glycol, triethylene glycol, 2,2,4-trimethyl-13-pentanediol, neopentyl glycol, hexanediol, cyclohexanedimethanol, cyclohexanediol, hydrogenated bisphenol A or xylylene glycol, a trihydric alcohol such as glycerol, trimethylolethane, trimethylolpropane or 1,2,6-hexanetriol, or a tetrahydric alcohol such as pentaerythritol.

As TMXDI, there may be mentioned the species m-TMXDI and p-TMXDI, and mixtures of these. Said monomeric TMXDI species have the respective structural formulas shown below and can be produced by the methods described in U.S. Pat. Nos. 3,290,350, 4,130,577 and 4,439,616, among others.

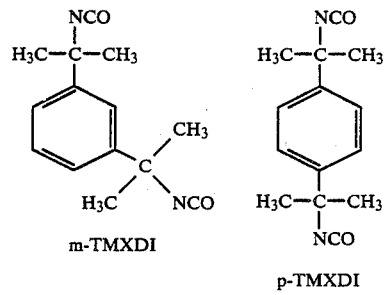

m-TMXDI p-TMXDI

The above-mentioned prepolymer can be produced by conducting the reaction generally in an NCO/active hydrogen equivalent ratio of about 2.0–15, preferably about 4–8, generally at 40°–140° C., preferably at 70°–100° C., followed, as necessary, by removal of the unreacted isocyanate monomer by the conventional thin-film distillation or extraction, for instance. For this reaction, an organometallic catalyst containing tin, lead, zinc, iron or the like may be used. A biuret or allophanate compound obtained by reacting water or a lower amine such as ethylenediamine with an excess of TMXDI may also be used as the prepolymer.

Blocked TMXDI or the TMXDI-derived blocked prepolymer can be produced by reacting TMXDI or a prepolymer derived therefrom with an oxime type blocking agent. Preferred examples of the oxime type blocking agent are acetoxime, methyl ethyl ketoxime, methyl isopropyl ketoxime, methyl butyl ketoxime, diethyl ketoxime, cyclohexanone oxime and acetophenone oxime. Among them, methyl ethyl ketoxime is particularly preferred.

As typical methods of effecting the blocking reaction, there may be mentioned, for example, the method comprising reacting TMXDI or a prepolymer derived therefrom with a blocking agent at an NCO/active hydrogen (in blocking agent) equivalent ratio of about 0.9 to 1.0, preferably about 0.95 to 1.0, the method comprising reacting TMXDI with a blocking agent at an NCO/active hydrogen (in blocking agent) equivalent ratio of about 1.1 to 3.0, preferably about 1.2 to 2.0, and then reacting the reaction product with such an active hydrogen-containing low-molecular-weight compound as mentioned above in relation to prepolymer production, and the method comprising reacting TMXDI with an active hydrogen-containing compound at an NCO-/active hydrogen equivalent ratio of about 1.5 to 10.0, preferably about 2.0 to 7.0, and then reacting the reaction product with a blocking agent.

Each reaction mentioned above is carried out in the conventional manner in the absence or presence of an active hydrogen-free solvent (e.g. an ester, such as ethyl acetate or butyl acetate; a ketone, such as acetone, methyl ethyl ketone or methyl isobutyl ketone; an ether, such as tetrahydrofuran). In carrying out the reaction, a known catalyst, such as a tertiary amine or an organometallic compound, may be used.

As the polyol compound (2) to be used in accordance with the invention, there may be mentioned polyester polyols, acrylic polyols, epoxy resins, polyether polyols and polyetherester polyols, and mixtures of these. The polyester polyols are obtainable by reacting a polybasic acid, such as phthalic acid, isophthalic acid, terephthalic acid, maleic acid, fumaric acid, succinic acid, adipic acid, sebacic acid, azelaic acid or trimellitic acid, with a polyol, such as ethylene glycol, diethylene glycol, propylene glycol, dipropylene glycol, 1,3-butanediol, 1,4-butanediol, 1,5-pentanediol, neopentyl glycol, hexamethylene glycol, decamethylene glycol, hydroquinone bis(hydroxyethyl ether), 2,2,4-trimethyl-1,3-pentanediol, hydrogenated bisphenol A, trimethylolethane, trimethylolpropane, hexanetriol, glycerol, pentaerythritol, tris(hydroxyethyl)isocyanurate, cyclohexanediol, cyclohexanedimethanol, xylylene glycol or quadrol, for condensation in the conventional manner under conditions such that the hydroxyl group is in excess. In this case, the acid and/or polyol may be a combination of two or more species. It is also possible to combinedly use castor oil, a higher fatty acid or the like to give the so-called oil-modified polyester polyol.

Among the polyester polyols obtained from the above combination of raw materials, those having a molecular weight of about 500-20,000, preferably about 2,000-10,000, a hydroxyl value of about 10-300, preferably about 20-200, and an acid value of about 1-50, preferably about 2-20 are preferably used.

As the acrylic polyol, there may be mentioned those obtained by copolymerizing (1) a hydroxyl-containing monomer such as 2-hydroxyethyl acrylate, 2-hydroxypropyl acrylate, 2-hydroxyethyl methacrylate, 2-hydroxypropyl methacrylate, allyl alcohol, cinnamyl alcohol, crotonyl alcohol or a reaction product from an unsaturated carboxylic acid, such as acrylic acid, methacrylic acid, maleic acid, fumaric acid, crotonic acid or itaconic acid, and ethylene glycol, ethylene oxide, propylene glycol, propylene oxide, butylene glycol, 1,4-cyclohexanedimethanol, phenyl glycidyl ether, glycidyl decanoate or the like and (2) at least one copolymerizable α, β-ethylenically unsaturated monomer such as an acrylic ester, e.g. methyl acrylate, ethyl acrylate, n-propyl acrylate, isopropyl acrylate, n-butyl acrylate, tert-butyl acrylate or 2-ethylhexyl acrylate; a methacrylic ester, e.g. methyl methacrylate, ethyl methacrylate, n-propyl methacrylate, isopropyl methacrylate, n-butyl methacrylate, tert-butyl methacrylate or 2-ethylhexyl methacrylate; a styrenic monomer, e.g. styrene, vinyltoluene or α-methylstyrene; acrylic acid, methacrylic acid, vinyl acetate, vinyl propionate, acrylonitrile, vinyl stearate, allyl acetate, diallyl adipate, dimethyl itaconate, diethyl maleate, vinyl chloride, vinylidene chloride, ethylene, glycidyl methacrylate, N-methylolacrylamide, N-butoxymethylacrylamide, acrylamide or diacetone acrylamide.

Among the acrylic polyols obtained from the above combination of raw materials, those having a molecular weight of about 5,000°-100,000, preferably about 10,000-50,000, and a hydroxyl value of about 10-300, preferably about 20-200, are preferably used.

As the epoxy resin, there may be mentioned, among others, those having at least two hydroxyl groups within each molecule, such as epoxy resins of the condensation type which are generally obtainable by reacting bisphenol A with epichlorohydrin. Such epoxy resins have a chemical structure such as the following:

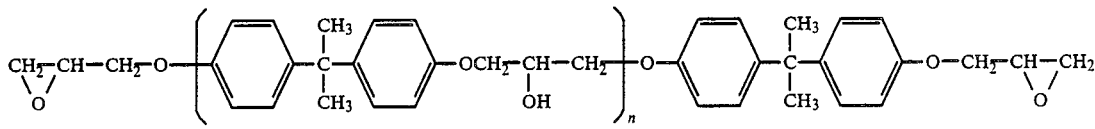

Among the above-mentioned epoxy resins, those in which n is about 2-12, preferably 2-10, and which have an epoxy equivalent of 425-10,000, preferably 425-4,000, are preferably used.

As the polyether polyol, there may be mentioned, for example, polymers of paraformaldehyde, α-polyoxymethylene or trioxane, polytetramethylene ether glycol and polyhexamethylene ether glycol. They preferably have a molecular weight of about 500-4,000 and a hydroxyl value of about 20-200.

As the polyether ester polyol, there may be mentioned the products of reaction among (1) a polyether polyol having a hydroxyl value of about 45-200, for instance, (2) a dibasic acid, such as phthalic anhydride, maleic anhydride, succinic anhydride, tetrahydrophthalic anhydride, 3,6-endomethylenetetrahydrophthalic anhydride, 3,6-endodichloromethylenetetrachlorophthalic anhydride, tetrachlorophthalic anhydride or tetrabromophthalic anhydride, and (3) an oxirane compound, such as ethylene oxide, propylene oxide, butylene oxide, styrene oxide, phenyl glycidyl ether or allyl glycidyl ether, which are obtainable by a known method. Those having a molecular weight of about 500-4,000 and a hydroxyl value of about 2-200 are preferably used.

As the solvent (3) to be used in the practice of the invention, there may be mentioned primary alcohols, such as methyl alcohol, ethyl alcohol, n-propyl alcohol, isobutyl alcohol, n-butyl alcohol, neopentyl alcohol, 2-methyl-1-butyl alcohol, 3-methyl1-butyl alcohol and n-amyl alcohol; secondary alcohols, such as isopropyl alcohol, sec-butyl alcohol, sec-amyl alcohol and sec-isoamyl alcohol; tertiary alcohols, such a t-butyl alcohol and t-amyl alcohol; glycol ethers, such as ethylene glycol monomethyl ether and ethylene glycol monoethyl ether; and halo alcohols, such as ethylene chlorohydrin, 2,2-difluoroethyl alcohol and 2,2,2-trifluoroethyl alcohol. Among them, those primary alcohols which have a boiling point of not higher than 150° C. are preferably used. The solvent (3) is used as a solvent for the blocked component (1) and polyol compound (2).

The ratio between the above-mentioned blocked component (1) and compound (2) is adjusted such that the equivalent ratio between the regenerated isocyanate group from said blocked component and the hydroxyl group amounts to about 0.5-2.0, preferably about 0.5-1.5.

The solvent (3) is used in an amount of about 1–50% by weight, based on the mixture of the blocked component and polyol compound.

The thus-obtained one-can resin composition according to the invention may contain one or more other components than the blocked component, polyol compound and monoalcohol, for example solvents generally used in baking paints, such as ethyl acetate, buthyl acetate, methyl acetoacetate, 2-ethoxyethyl acetate, other similar esters, xylene, toluene, other similar aromatics, methyl ethyl ketone, methyl isobutyl ketone, cyclohexanone, other similar ketones, diethylene glycol dimethyl ether and other similar ethers, pigments, leveling agents, antifoaming agents, dissociation catalysts, and stabilizers. Solvents are used in an amount of about 0–90% by weight based on the solids resulting from the blocked component and polyol compound.

The thus-obtained one-can resin composition, when stored at 40° C., is stable for at least 3 months. It can be cured at temperatures as low as 90°–120° C. (Therefore, it can be used advantageously as a baking paint for automotive exterior coating, cationic electrodeposition coating, coating of household electric appliances, and enameled wire manufacture, among others.

The following examples illustrate the invention in more detail. In the examples, "part(s)" and "%" are "part(s) by weight" and "% by weight", respectively.

EXAMPLE 1

TMXDI (732 parts) was dissolved in 336 parts of butyl acetate and 336 parts of ethoxyethyl acetate, and the solution was heated at 75°–80° C. Following addition of 0.2 part of 1,1,3,3-tetra-n-butyl 1,3-diacetoxydistannoxane, 134 g of molten trimethylolpropane was added dropwise over 1 hour. After completion of the dropping, the mixture was heated at 75°–80° C. for further 5 hours. After completion of the reaction, the reaction mixture was cooled to room temperature and, then, 261 parts of methyl ethyl ketoxime was added dropwise over 1 hour. After completion of the dropping, the resultant mixture was heated at 75°–80° C. for 1 hour. Thus was obtained a blocked polyisocyanate solution with a regenerable isocyanate group content of 7.0% and a solids content of 48.2%.

Separately, 700 parts of methyl methacrylate, 207 parts of n-butyl acrylate and 93 parts of 2-hydroxyethyl methacrylate were copolymerized in the conventional manner in 500 parts of xylene and 500 parts of butyl acetate to give an acrylic polyol with a molecular weight of about 15,000, a solids content of 50% and a hydroxyl value of about 20.

The above acrylic polyol (2,800 parts), 1126 parts of titanium oxide (Tipaque R-930; Ishihara Sangyo Kaisha, Ltd.) and 290 parts of ethyl alcohol were mixed up, followed by addition of 3 parts of 1,1,3,3-tetra-n-butyl-1,3-diacetoxydistannoxane and 600 parts of the above-mentioned blocked polyisocyanate solution and mixing up, which gave a one-can coating composition. This coating composition was sprayed onto a 0.8-mm mild steel sheet in an amount to give a 50 μm thick cured coat film, and baking was carried out at 100° C. for 20 minutes. The performance characteristics of the cured film are shown in Table 1. This one-can coating composition showed no changes in viscosity, curability and so forth even after two months of storage at 40° C.

COMPARATIVE EXAMPLE 1

One-can coating composition was prepared in the same manner as in Example 1 except that ethyl acetate was used in place of ethyl alcohol. This coating composition was curable by treatment at 100° C. for 20 minutes, but was poor in storage stability, as revealed by its gelation within 4 days upon storage at 40° C.

EXAMPLE 2

TMXDI (244 parts) was dissolved in 91 parts of butyl acetate and 91 parts of ethoxyethyl acetate. To the solution was added dropwise over 1 hour 174 parts of methyl ethyl ketoxime. After completion of the dropping, the resultant mixture was heated at 75°–80° C. for 1 hour. The thus-produced blocked polyisocyanate solution had a regenerable isocyanate group content of 14% and a solids content of 41%.

One-can coating composition was prepared following the procedure of Example 1 except that 300 parts of the above blocked polyisocyanate solution was used in lieu of the blocked polyisocyanate solution used in Example 1. A mild steel sheet was spray-coated with the one-can coating composition in the same manner as in Example 1. The coat film was baked at 110° C. for 20 minutes. The physical properties of the coat film are shown in Table 1.

EXAMPLE 3

A polyester polyol having an acid value of 2.4 and a hydroxyl value of 55 was prepared by blowing nitrogen gas heated at 220° C. into a mixture of 581.5 parts of isophthalic acid, 707.9 parts of sebacic acid, 624.9 parts of neopentyl glycol and 124.1 parts of ethylene glycol to thereby effect the reaction and distill off the by-product water. This polyol was dissolved in a mixed solvent composed of equal volumes of xylene and ethoxyethyl acetate to give a solution having a solids content of 40%.

The above polyester polyol solution (2,550 parts) and 872 parts of titanium oxide (Tipaque R-930; Ishihara Sangyo Kaisha, Ltd.) were mixed up. Thereto were further added 2 parts of 1,1,3,3-tetra-n-butyl-1,3-diacetoxydistannoxane, 600 parts of the blocked polyisocyanate solution of Example 1 and 170 parts of ethyl alcohol. Thus was prepared one-can coating composition.

A mild steel sheet was spray-coated with the above composition in the same manner as in Example 1, and baking was carried out at 100° C. for 20 minutes. The physical properties of the coat film are shown in Table 1.

TABLE 1

|  | Example 1 | Example 2 | Example 3 | Comparative Example 1 |
|---|---|---|---|---|
| Gloss (specular gloss, 60°) | 98 | 96 | 98 | 98 |
| Pencil hardness | 2H | 2H | 2H | 2H |
| Rubbing test with ethyl acetate (50 times) | Yes | Yes | Yes | Yes |
| Bending test (mm φ) | 3 | 3 | 3 | 3 |
| Acid resistance test (5% $H_2SO_4$, 7 days) | Yes | Yes | Yes | Yes |
| Alkali resistance test (5% NaOH, 7 days) | Yes | Yes | Yes | Yes |
| Shelf life (40° C.) | >3 | >3 | >3 | 4 days |

TABLE 1-continued

|  | Example 1 | Example 2 | Example 3 | Comparative Example 1 |
| --- | --- | --- | --- | --- |
|  | months | months | months |  | cl COMPARATIVE EXAMPLE 2

A blocked polyisocyanate was synthesized by the procedure of Example 1 except that ε-caprolactam (339 parts) was used in lieu of methyl ethyl ketoxime. One-can coating composition was prepared by using this polyisocyanate in combination with the acrylic polyol of Example 1. This coating composition was curable only at 140° C. or above.

EXAMPLE 4

One-can coating composition was prepared in the same manner as in Example 2 except that ethylene glycol monoethyl ether was used in lieu of ethyl alcohol. This coating composition could be stored stably at 40° C. for more than 2 months. It had good curability, as evidenced by the fact that it was bakable at 100° C.

EXAMPLE 5

One-can coating composition was prepared in the same manner as in Example 2 except that n-butyl alcohol was used in lieu of ethyl alcohol. This coating composition could be stored stably at 40° C. for more than 3 months. It had good curability, as evidenced by the fact that it was bakable at 100° C.

What is claimed is:

1. A one-can resin composition which contains:
(1) a blocked polyisocyanate produced by blocking, with an oxime type blocking agent, $\alpha,\alpha,\alpha'\alpha'$-tetramethylxylene diisocyanate or a terminal NCO-containing prepolymer formed by reaction of said diisocyanate with an active hydrogen-containing compound,
(2) a polyol compound selected from the group consisting of polyester polyols, acrylic polyols, epoxy resins, polyether polyols, polyetherester polyols and mixtures thereof, and
(3) as a solvent, a monoalcohol, a glycol ether or a halo alcohol;
wherein the ratio between the blocked polyisocyanate (1) and the polyol compound (2) is adjusted such that the equivalent ratio between the regenerated isocyanate group from said blocked polyisocyanate and the hydroxyl group amounts to about 0.5-2.0, said solvent (3) being used as a solvent for the blocked polyisocyanate and the polyol compound, and wherein the solvent (3) is used in an amount of about 1-50% by weight, based on the mixture of the blocked polyisocyanate (1) and the polyol compound (2).

2. The resin composition as claimed in claim 1, wherein the blocked polyisocyanate (1) is one produced by blocking with an oxime type blocking agent, a terminal NCO-containing prepolymer formed by reaction of $\alpha,\alpha,\alpha',\alpha'$-tetramethylxylene diisocyanate with an active hydrogen-containing low-molecular-weight compound.

3. The resin composition as claied in claim 1, wherein the polyol compound (2) is a polyester polyol or an acrylic polyol.

4. The resin composition as claimed in claim 1, wherein the solvent (3) is a primary alcohol.

5. The resin composition as claimed in claim 1, wherein the blocked polyisocyanate is one produced by blocking with methyl ethyl ketoxime, $\alpha,\alpha,\alpha',\alpha'$-tetramethylxylylene diisocyanate or a prepolymer formed by reaction of said diisocyanate with trimethylolpropane.

6. The resin composition as claimed in claim 3, wherein the polyester polyol is one produced by reacting isophthalic acid, sebacic acid, neopentyl glycol and ethylene glycol.

7. The resin composition as claimed in claim 3, wherein the acrylic polyol is one produced by copolymerizing methyl methacrylate, n-butyl acrylate and 2-hydroxyethyl methacrylate.

8. The resin composition as claimed in claim 4, wherein the primary alcohol is one having a boiling point of not higher than 150° C.

9. The resin composition as claimed in claim 8, wherein the primary alcohol is ethyl alcohol.

10. The resin composition as claimed in claim 1, wherein the solvent (3) is ethylene glycol monoethyl ether.

11. The resin composition as claimed in claim 8, wherein the primary alcohol is n-butyl alcohol.

12. A cured resin which is prepared by baking a one-can resin composition containing:
(1) a blocked polyisocyanate produced by blocking, with an oxime type blocking agent, $\alpha,\alpha,\alpha',\alpha'$-tetramethylxylylene diisocyanate or a terminal NCO-containing prepolymer formed by reaction of said diisocyanate with an active hydrogen-containing compound,
(2) a polyol compound selected from the group consisting of polyester polyols, acrylic polyols, epoxy resins, polyether polyols, polyetherester polyols and mixtures thereof, and
(3) as a solvent, a monoalcohol a glycol ether or a halo alcohol;
wherein the ratio between the blocked polyisocyanate (1) and the polyol compound (2) is adjusted such that the equivalent ratio between the regenerated isocyanate group from said blocked polyisocyanate and the hydroxyl group amounts to about 0.5-2.0, said solvent (3) being used as a solvent for the blocked polyisocyanate and the polyol compound, and wherein the solvent (3) is used in an amount of about 1-50% by weight, based on the mixture of the blocked polyisocyanate (1) and the polyol compound (2).

* * * * *